INVENTORS.
ONLEY E. ARNOLD
GERALD J. WATKINS
BY Donald F. Voss
ATTORNEY

United States Patent Office 3,209,331

Patented Sept. 28, 1965

3,209,331
DATA CONTROL APPARATUS

Onley E. Arnold, Owego, and Gerald J. Watkins, Endicott, N.Y., assignors to International Business Machines Corporation, New York, N.Y., a corporation of New York Filed May 10, 1961, Ser. No. 109,150
6 Claims. (Cl. 340—172.5)

Figure 1:
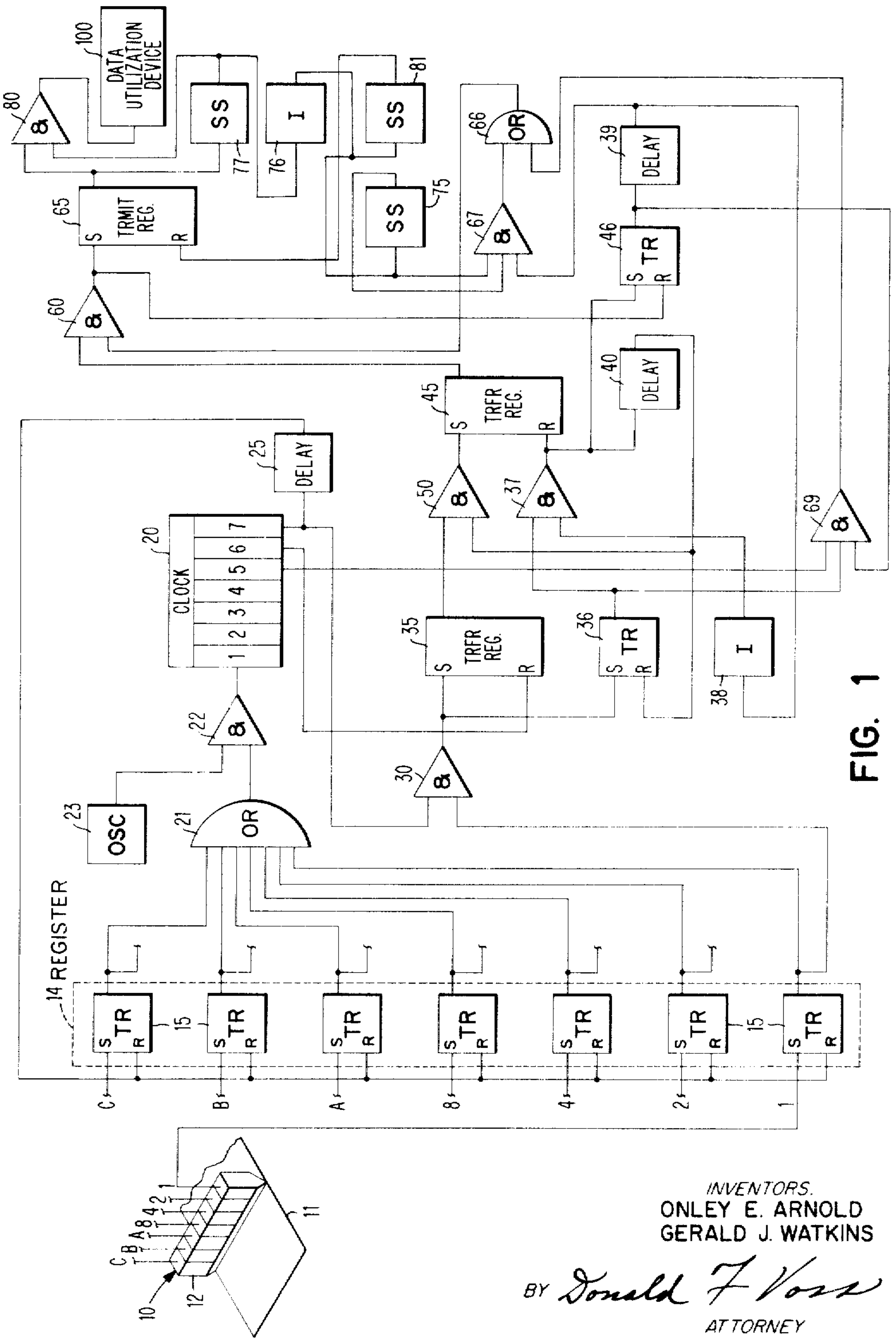

This invention relates to apparatus for controlling the transfer of data from a data source to a data utilization device and, more particularly, to apparatus for asynchronously controlling the transfer of data from a data source to a data utilization device where the data transfer rate is normally at the rate of the data source unless that rate exceeds a predetermined maximum rate. If the data rate of the data source exceeds the predetermined maximum data rate, first controls are provided so that data flows to the utilization device at the predetermined maximum data rate. If the data rate of the data source continues to exceed the predetermined maximum data rate for a period of time such that the first controls cannot control the data rate at the predetermined maximum data rate without the loss of data, second controls are called into operation to permit data to flow to the utilization device at the rate data is coming from the data source. These second controls remain in operation only for that period of time that the first controls are ineffective to control the data rate at the predetermined maximum data rate until the time they are effective to do so.

The data itself brings the first controls into operation and the various conditions of the first controls determine whether or not the second controls are brought into operation.

The invention is very suitable to be incorporated into a data processing system where the data source is at one location and the data utilization device is to send the data to a remotely located data processing device.

Accordingly, a very important object of the invention is to provide apparatus for asynchronously controlling the transfer of data from a data source to a data utilization device.

Another very important object of the invention is to provide apparatus for asynchronously controlling the transfer of data from a data source to a data utilization device which permits the data to flow at the rate of the data source when that rate is at or below a predetermined maximum data rate and to flow at the predetermined maximum data rate when thereabove.

Another object of the invention is to provide apparatus which permits data to transfer from a data source to a data utilization device at the rate of the data source when the data transfer rate exceeds a predetermined maximum data rate for an interval of time where the data rate cannot be held to the predetermined maximum data rate.

The foregoing and other objects, features and advantages of the invention will be apparent from the following more particular description of a preferred embodiment of the invention, as illustrated in the accompanying drawings.

Figure 2:
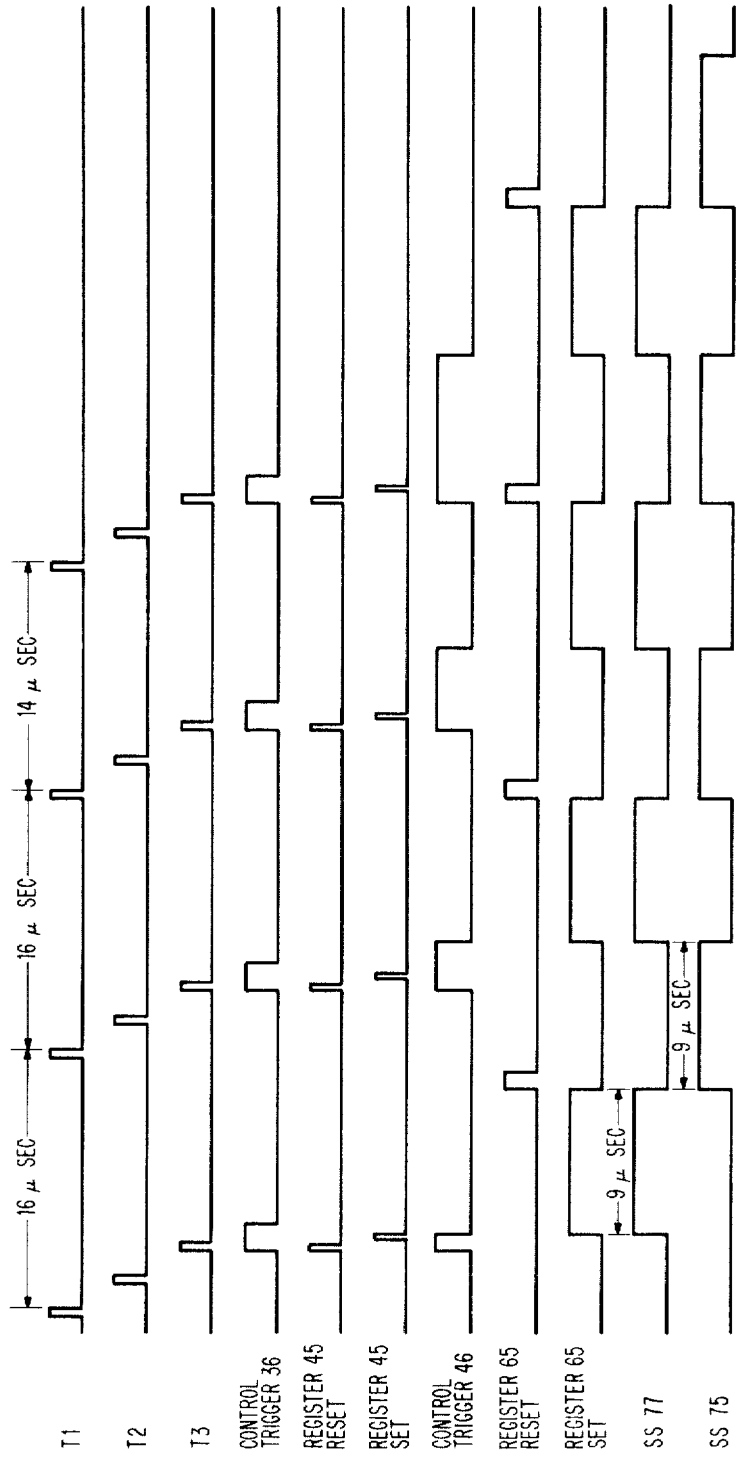

In the drawings:

FIG. 1 is a schematic diagram of one arrangement of apparatus which may be employed in the practice of the invention; and, FIG. 2 is a timing diagram.

Referring to the drawings and more particularly to FIG. 1, the invention is illustrated by way of example as a magnetic tape reader 10 which functions as a data source for data utilization device 100. Magnetic tape 11 has data recorded thereon in the form of magnetized spots which are arranged in seven parallel channels so as to represent data characters according to the well-known 7-bit code comprising bits C, B, A, 8, 4, 2 and 1. The data recorded upon the magnetic tape 11 is adapted to be read by fixedly positioned magnetic read heads 12 as the magnetic tape 11 is moved relative thereto in a conventional manner by apparatus not shown. The data flows from the magnetic read heads 12 parallel by bit and serial by character to a 1-character deskewing register 14 consisting of a trigger 15 for each bit position. The first bit entered into the register 14 starts a clock 20. This is accomplished by means of a logical OR circuit 21 which has its inputs connected to the outputs of the triggers 15 of register 14. The output of the logical OR circuit 21 is connected as an input to a logical AND circuit 22 which also has an input connected to the output of an oscillator 23. The output of the logical AND circuit 22 is connected to the clock 20. Hence, by this arrangement, whether or not the bits forming a character enter the register 14 simultaneously, the first bit of a character entering the register 14 will start the clock 20. By starting the clock 20 with the first bit into register 14, a timing relationship for each character is realized.

The clock 20 is shown as having seven outputs. An electrical impulse appears at each output sequentially in time. The timing signals appearing at these outputs are approximately of 400 nanoseconds duration and spaced from each other with substantially the same duration. The seventh output of clock 20 is connected to a delay device 25, of the type well known in the art, which, in turn, is commonly connected to the reset terminals of triggers 15 forming register 14. The delay device 25 and all those delay devices to be described subsequently introduce a delay of approximately 400 nanoseconds. Unless an error condition exists, all bits forming a character are in register 14 by the time an electrical impulse appears at the seventh terminal of clock 20. Shortly thereafter, because of delay device 25, the triggers 15 are reset to prepare or switch them to a state for receiving the next character.

Data flows from register 14 under control of logical AND circuits 30, only the one for the 1 bit being shown, to a 1-character first transfer register 35. The logical AND circuits 30 each have an input connected to the seventh output of clock 20 so as to be conditioned when a timing impulse T–3, FIG. 2, appears at the output thereof. Transfer register 35 has its reset terminal connected to the sixth output of clock 20 so as to be in the reset condition by action of a timing impulse T–2, FIG. 2, prior to receiving data from register 14 at T-3 time.

The entry of data into first transfer register 35 is noted or detected by a first control trigger 36 which has its set terminal commonly connected to the outputs of logical AND circuits 30. The first control trigger 36 not only functions to indicate that data has been entered into first transfer register 35, but it also develops a signal for controlling the transfer of data from the first transfer register 35 to a second transfer 1-character register 45.

The output of control trigger 36 associated with the set side thereof is connected as an input to a logical AND circuit 37 also having an input connected to the output of an inverter 38. Inverter 38 has its input connected to the output of a delay device 39 which has its input connected to the output of a second control trigger 46 which functions to indicate whether of not data has been entered into the second transfer register 45. The set terminal of the second control trigger 46 is connected to the output of logical AND circuit 37 which also has its output connected to a delay device 40 and to the reset terminal of transfer register 45. The output of the delay device 40 is connected to the reset terminal of the first control trigger 36 and to one input of a logical AND circuit 50 which has another input connected to the output of first transfer register 35. Hence, if there is no data in the second transfer register 45, data in the first transfer register 35 will automatically transfer thereto because first control trigger 36 is conditioning logical AND circuit 37 to pass the signal coming from the second control trigger 46 via delay device 39 and inverter 38. The signal passed by logical AND circuit 37 resets the transfer register 45, sets the second control trigger 46, is delayed, and the delayed signal resets the first control trigger 36 and conditions logical AND circuit 50 to pass the data from the first transfer register 35 to the second transfer register 45. If data is already in the second transfer register 45, the second control trigger 46 will already be set and, consequently, logical AND circuit 37 will not be conditioned to pass a signal for resetting second transfer register 45. Further, logical AND circuit 37 will not pass a signal to condition logical AND circuit 50; hence, the data will not transfer from the first to the second control register.

Data leaves the second transfer register 45 under control of a logical AND circuit 60 to enter a 1-character transmit register 65 from which the data is transmitted to data utilization device 100. The presence of data in transmit register 65 starts a series of timing controls to develop. In this example, the presence of a character in register 65 causes the development of a nine microsecond interval during which data may be transferred from the transmit register 65 and at the same time prevents entry of data from the second transfer register 45, and also causes the development of another nine microsecond interval, occurring consecutively, which interlocks or blocks the entry of data from the second transfer register 45 for another nine microseconds. It is seen that this set of timing controls is called into operation by data entering transmit register 65 and is effective to provide a maximum data rate. Hence, data may be read from the magnetic tape 11 at a rate exceeding the maximum data rate, but it will be transmitted to the data utilization device 100 at the maximum data rate, provided the capacity of the controls is not exceeded.

Logical AND circuit 60 has one input connected to the output of the second transfer register 45 and another input which is connected to the output of a logical OR circuit 66. Logical OR circuit 66 permits the conditioning of logical AND circuit 60 from two sources. One source is via a logical AND circuit 67 having its output connected to one input of logical OR circuit 66. The other source is via a logical AND circuit 69 which has its output connected to the other input of logical OR circuit 66.

Logical AND circuit 67 has one input connected to the output of an interlock or interval single-shot multivibrator 75, an input connected to the output of an inverter 76, and an input connected to the output of delay device 39. The interval single-shot multivibrator 75 has its input connected to the output of inverter 76 which has its input connected to the output of a sampling single-shot multivibrator 77. The sampling single-shot multivibrator 77 has its input connected to the output of the transmit register 65. Both single-shot multivibrators 75 and 77 have a period of approximately nine microseconds. The interval single-shot multivibrator 75 is of the type which normally conducts so that its output is at a positive level. It is switched or triggered on the fall of the output of the sampling single-shot multivibrator 77. Therefore, when the interval single-shot multivibrator 75 and the sampling single-shot multivibrator 77 are not switched, logical AND circuit 67 will pass a signal for conditioning logical AND circuit 60 via logical OR circuit 66. Under this condition, data transfers from transfer register 45 to transmit register 65. The output of logical AND circuit 60 is connected to the rest terminal of control trigger 46. Hence, as logical AND circuit 60 permits data to pass from transfer register 45, the control trigger 46 is reset to indicate that transfer register 45 is empty.

The sampling single-shot multivibrator 77 has its output connected to one input of a logical AND circuit 80 which has another input connected to the output of the transmit register 65. The output of the logical AND circuit 80 is connected to the input of utilization device 100. By this arrangement, the sampling single-shot multivibrator 77 provides an interval of nine microseconds during which data can pass from the transmit register 65 to the utilization device 100. At the same time, the sampling single-shot multivibrator 77 provides a block to the transfer of data from transfer register 45 to transmit register 65 because it will decondition logical AND circuit 67 which in turn deconditions logical AND circuit 60 via logical OR circuit 66.

The output of the inverter 76 is also connected to the input of a reset single-shot multivibrator 81 having its output connected to the reset terminal of the transmit register 65. The reset single-shot multivibrator 81 only functions to reset the transmit register 65 after completion of the transmission of data therefrom.

Logical AND circuit 69 functions to pass a signal via logical OR circuit 66 to condition logical AND circuit 60 when data is in transfer registers 35 and 45 and the interval single-shot multivibrator 75 is on at the time a timing signal T–1 appears at the fifth output of clock 20 because this signals that another character is being processed in the register 14 and will be ready for transfer to the transfer register 35 at T–3 time. Under these circumstances, the transfer of data is forced at T–1 time from transfer register 45 to transmit register 65, and data then transfers automatically from transfer register 35 to transfer register 45 to make room for incoming data into transfer register 35 at T–3 time. Hence, logical AND circuit 69 has an input connected to the output of the first control trigger 36, an input connected to the output of the second control trigger 46, and an input connected to the fifth output of the clock 20. Hence, when control triggers 36 and 46 are set and if the interval single-shot multivibrator 75 is also still on so as to decondition logical AND circuit 67, logical AND circuit 69 will pass a signal at the time a signal appears at the fifth output of the clock 20, or at time T–1, as shown in FIG. 2. The signal passed by logical AND circuit 69 conditions logical AND circuit 60 via logical OR circuit 66 to pass data from transfer register 45 to transmit register 65. Under this latter condition the second control trigger 46 will be reset, thereby permitting the resetting of transfer register 45 prior to the entry of data from transfer register 35.

Since the first bit of data of a character of data read from magnetic tape 11 by magnetic read heads 12 starts the clock 20 and the spacing between characters on the tape may vary slightly or the frequency at which the characters are read may vary due to fluctuations in the drive for the tape, the clock 20 may be started at non-uniform time intervals as shown in FIG. 2. However, once the clock 20 is started, the timing signals occur at regular intervals with a 1½ microsecond delay between the signals, the delay being introduced by the characteristics of the clock itself.

In the example given, the rate at which characters are read from the magnetic tape 11 does exceed the acceptance rate of the data utilization device 100; however, because of the sampling single-shot multivibrator 77 and the interval single-shot multivibrator 75, the rate at which characters are transferred to the data utilization device is within the acceptance rate thereof. This is illustrated by the timing diagram of FIG. 2.

In operation of the invention for the example given, FIG. 1, data recorded upon magnetic tape 11 is read by magnetic read heads 12 as the magnetic tape 11 is moved relative thereto. When starting a data read operation, the registers 14, 35, 45 and 65 are reset. This may be accomplished by any well-known means such as by a delayed read start signal from a programming device which could be a computer, etc.

Further, between the time the tape drive unit, not shown, is started and the time it attains its proper operating speed, the read circuits are not active. This is accomplished by a delay circuit, not shown, which is not pertinent to the invention. After a tape has come up to speed, speed fluctuations occur which cause characters to be read at an accelerated rate. However, whatever the rate may be, the character read by the magnetic read heads 12 is transmitted to the deskewing register 14. All the bits forming the character transmitted may arrive at the register 14 simultaneously or one bit may arrive ahead of the others. In any event, the first bit entering register 14, because of logical OR circuit 21, conditions logical AND circuit 22 to pass the signals from oscillator 23 to clock 20. The clock 20 allows a definite amount of time to read all bits of any one character. If all bits forming a character are not read by the time a signal appears at the seventh output of the clock 20, an error condition exists. The detection of this error condition does not form a part of this invention and therefore is not shown and will not be described any further. Assuming that all bits forming the character are transferred to register 14, then, at the time there is a signal at the seventh output, logical AND circuit 30 will be conditioned to pass the character to the first transfer register 35. Initially, first transfer register 35 is reset along with registers 45 and 65. Thereafter it is reset by a signal appearing at the sixth output of the clock 20. At the same time, first control trigger 36 is set. Shortly thereafter, because of delay unit 25 which introduces a 400 nanosecond delay, the register 14 is reset to be in condition for accepting another character from the magnetic tape 11. Further, because second control trigger 46 is not set, logical AND circuit 37 is conditioned by inverter 38 to pass the signal coming from first control trigger 36. The signal passed by logical AND circuit 37 resets transfer register 45, which was already reset initially, and is also delayed 400 nanoseconds by delay unit 40 and then conditions logical AND circuit 50 to transfer the data from the first transfer register 35 to the second transfer register 45. It should be noted that logical AND circuit 69 is not conditioned at this time because the second control trigger 46 had not been set as yet. The second control trigger 46 is set as data transfers to the second transfer register 45; however, the first control trigger 36 is simultaneously reset to indicate that the first transfer register 35 is empty.

Logical AND circuit 60 will be conditioned at this time by logical AND circuit 67 since sampling single-shot multivibrator 77 is off because of the initial reset condition of transmit register 65. Hence, interval single-shot multivibrator 75, which has a positive signal when it is off, will also be off. Since, the second control trigger 46 is set at this time, all conditions of the logical AND circuit 67 are satisfied to pass a signal via logical OR circuit 66 for conditioning logical AND circuit 60. Hence, the character in the second transfer register 45 is transferred to the transmit register 65. Upon the transfer taking place, the second control trigger 46 is reset. During the next nine microseconds, the data in transmit register 65 is gated out because sample single shot 77 is set on by the presence of data in the transmit register 77; and the single shot 77, when in the on state, also conditions logical AND circuit 80 to pass the data character in transmit register 65 to the data utilization device 100.

During the nine microsecond interval, a character of data could have been read from tape and been transferred to the register 14, from the register 14 to the first transfer register 35 and from there to the second transfer register 45. However, the data character cannot immediately transfer from the second transfer register 45 to the transmit register 65 because logical AND circuit 60 will not be conditioned. This is because neither logical AND circuits 67 or 69 are conditioned. The sample single-shot multivibrator 77 is deconditioning logical AND circuit 67 and the first control trigger 36 is deconditioning logical AND circuit 69. These conditions remain for a subsequent nine microseconds because, upon the going off or fall of the sample single-shot multivibrator 77, the interval single-shot multivibrator 75 goes on. Hence, logical AND circuit 67 remains deconditioned for another nine microseconds. It may be noted that transmit register 65 is reset during this interval because reset single-shot multivibrator 81 is set on, the resetting occurring when the same goes off. The period of the single-shot multivibrator 81 is approximately 400 nanoseconds.

Logical AND circuit 69 will also be deconditioned during this nine microsecond interval unless another data character is transferred into the first transfer register 35. If this occurs, logical AND circuit 69 is conditioned at the time there is a signal T–1 and the data character in the second transfer register will immediately transfer to the transmit register 65 which is empty and already reset at this time. A sample interval of nine microseconds will again be initiated. This interval will be followed by another nine microsecond interval unless registers 35 and 45 are again loaded with a data character. The data character in register 35 transfers to register 45 as soon as the data character in register 45 transfers to transmit register 65. It should be noted that the character interval is in the range of microseconds while the consecutive transfer of data from registers 14, 35, 45 to register 65, respectively, is in the order of nanoseconds. Hence, if data is read from the magnetic tape 11 at a character rate of twenty microseconds, it would be transmitted to the data utilization device 100 at the rate of twenty microseconds because single-shot multivibrators 75 and 77 would be off before another character is set in transmit register 65. However, if data is read from the magnetic tape 11 at a sixteen microsecond character rate, as in FIG. 2, the character would be transmitted to data utilization device 100 only at the rate of eighteen microseconds because the interval single-shot multivibrator 75 will be on to decondition logical AND circuit 67.

Since character crowding, as in FIG. 2, is only an abnormal condition, the accelerated character rate will not usually continue indefinitely. If it is sustained for an unusually long interval, logical AND circuit 69 will permit the data to transfer to the data utilization device as fast as it is being read from the magnetic tape 11, until the data rate changes so that register 45 can contain a data character for an eighteen microsecond interval, before a character is set into register 35. Under this latter condition, logical AND circuit 69 is deconditioned. In FIG. 2, it is seen that control trigger 36 is on for the same length of time for each character read; however, because the data rate is exceeding the predetermined maximum character rate, the duration of the second control trigger is increasing for each character because the transfer rate from register 45 to register 65 is set at the predetermined maximum data rate. The interval of time that the second control trigger 46 is on decreases as the data rate decreases.

From the foregoing, it is seen that the transfer of data from the magnetic tape 11 to the data utilization device 100 is asynchronously controlled. The rate of transfer is at the rate that the data is read or at a predetermined maximum rate if the rate of data read exceeds the predetermined maximum rate. If the rate at which data is read exceeds the predetermined maximum rate for any sustained period of time, the data is transferred to the data utilization device at the exceeded predetermined maximum until the data transfer rate may again be held to the predetermined maximum rate, even though the data read rate still exceeds the predetermined maximum data transfer rate.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for asynchronously controlling the transfer of data from a data source to a data utilization device comprising:

a first data transfer register for storing a single data character at any one time;

control means for successively entering in a serial fashion data characters from said data source into said first data transfer register at discrete timed intervals;

first data indicating means for indicating that data has transferred to said first data transfer register, said first data indicating means being connected to be set by said control means when the same enters data into said first data transfer register;

a second data transfer register for storing a single character of data at any one time, said second data transfer register being connected to receive data from said first data transfer device;

a first data control device for controlling the passage of data from said first data transfer register to said second data transfer register;

second data indicating means for indicating that data has been transferred to said second data transfer register, said second indicating means being connected to control said first data control device so as to render the same operative only when said second data transfer register is empty;

a transmit register for temporarily storing a single character of data at any one time;

a second data control device for controlling the passage of data from said second data transfer register to said transmit register;

data gating means connected between said transmit register and said utilization device; and data sampling means connected to said transmit register to be rendered operable, thereby, when data is entered therein and connected to said data gating means and said second data control device, said sampling means, upon being rendered operable, enables said data gating means to allow data to flow from said transmit register to said data utilization device and causes said second data control device to prevent the transfer of data from said second data transfer register to said ransmit register.

2. Apparatus for asynchronously controlling the transfer of data from a data source to a data utilization device comprising:

a first data transfer register for storing a single data character at any one time;

means for successively entering in a serial fashion data characters from said data source into said first data transfer register at discrete time intervals;

a first data indicating device for indicating when a data character is stored in said first data transfer register;

a second data transfer register for storing a single data character at any one time;

a second indicating device for indicating when a data character is stored in said second transfer register;

means for resetting said first data transfer register at discrete time intervals;

means for resetting said second data transfer register under control of said first and second indicating devices;

first data gating means connected to be operably controlled to pass a data character from said first to said second transfer register when said second indicating device indicates that said second transfer register is empty;

a transmit register for storing a single data character at any one time;

a first timing device connected to said transmit register to be rendered operable thereby when the same contains a data character to provide a sampling electrical signal of a predetermined time duration;

a second timing device connected to said first timing device to be rendered operable thereby when said sampling electrical signal terminates to provide an interval timing signal of a predetermined time duration;

second data gating means connected to control the transfer of data from said second transfer register to said transmit register, said second data gating means being operably controlled by said first and second timing devices, said second data gating means being operable to pass data to said transmit register in the absence of said sampling and said interval electrical signals; and third data gating means connected to said transmit register and said first timing device to control the transfer of data from said transmit register to said data utilization device, said third data gating means being operable to pass data to said data utilization device upon receiving said sampling signal from said first timing device.

3. Apparatus for controlling the transfer of data from a data source to a data utilization device as in claim 2 wherein said first and second timing devices are single-shot multivibrators.

4. Apparatus for asynchronously controlling the transfer of data from a data source to a data utilization device according to claim 2 further comprising control means operably connected to said first and second indicating devices and connected to said second data gating means to provide a control signal to second data gating means to render the same operable to pass the data from said second transfer register to said transmit register when said first and second indicating devices indicate that there is a data character in said first and second transfer registers.

5. Apparatus for asynchronously controlling the transfer to data from a data source to a data utilization device comprising:

first, second and third data storage registers each having the capacity to store a single data character at any one time;

means connecting said first data storage register to said data source and to said second data storage register so that data automatically transfers from said data source to said first data storage register and therefrom to said second data storage register whenever said second data storage register is empty;

signal generating means for generating time control signals in response to data entering said third register; and means operative under control of said signal generating means for connecting said third data storage register to said data utilization device during the generation of one of said time control signals and to said second data storage register prior to generation of and after the lapse of said one time control signal.

6. Apparatus for asynchronously controlling the transfer of data from a data source to a data utilization device as in claim 5 further comprising means for forcing a transfer of data from said second to said third data storage registers if said first and second data storage registers are storing data during the time interval of said one time control signal.

References Cited by the Examiner

UNITED STATES PATENTS

| | | | |
|---|---|---|---|
| 2,907,004 | 9/59 | Chien et al. | 340—172.5 |
| 2,944,248 | 7/60 | Auerbach et al. | 340—172.5 |
| 2,945,221 | 7/60 | Hinton et al. | 340—172.5 |
| 2,951,233 | 8/60 | Tanco et al. | 340—172.5 |
| 3,014,654 | 12/61 | Wilser et al. | 235—61.11 |
| 3,037,194 | 5/62 | Dirks | 340—172.5 |
| 3,051,787 | 8/62 | Parks | 340—172.5 |

ROBERT C. BAILEY, *Primary Examiner.*

DARYL W. COOK, MALCOLM A. MORRISON, *Examiners.*